(No Model.)
F. & E. S. P'POOL.
IMPLEMENTINO FOR CUTTING BRIERS.
No. 280,667. Patented July 3, 1883.
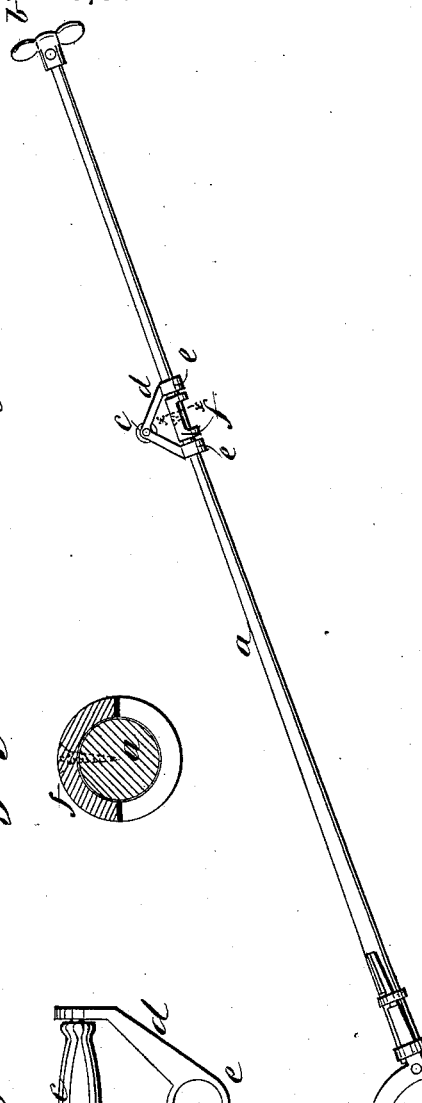
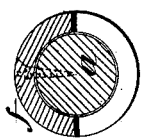
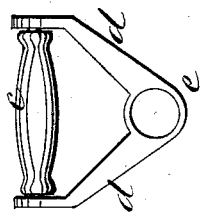
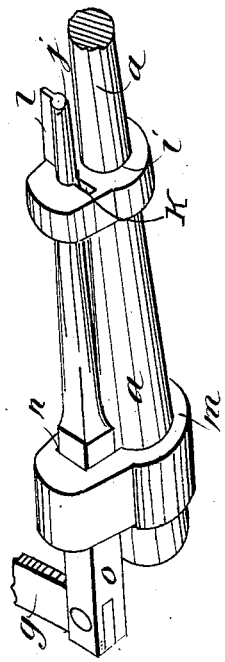
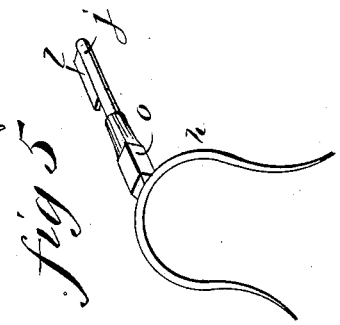
WITNESSES:
Chas. F. Howell,
C. Sedgwick
INVENTOR:
E. S. P'Pool
F. P'Pool
BY Munn & Co.
ATTORNEYS.

UNITED STATES PATENT OFFICE.

FRANK P'POOL AND ELBERT S. P'POOL, OF EDWARDS, MISSISSIPPI.

IMPLEMENT FOR CUTTING BRIERS.

SPECIFICATION forming part of Letters Patent No. 280,667, dated July 3, 1883.

Application filed January 9, 1883. (No model.)

*To all whom it may concern:*

Be it known that we, FRANK P'POOL and ELBERT S. P'POOL, both of Edwards, in the county of Hinds and State of Mississippi, have invented a new and Improved Implement for Cutting and Handling Briers, Weeds, &c., of which the following is a full, clear, and exact description.

The object of the invention is to so construct an implement for cutting and handling briers, so secure it to the handle, and so provide the handle with hand-holders that both the cutting, collecting, and moving of the briers may be done in an easy, convenient, and effective manner.

Reference is to be had to the accompanying drawings, forming part of this specification, in which similar letters of reference indicate corresponding parts in all the figures.

Figure 1 is a side elevation of my improved implement. Fig. 2 is a section of the staff, taken on line $xx$ of Fig. 1. Fig. 3 is a side elevation of the handle attachment to the staff. Fig. 4 is a perspective view of a section of the staff and the contrivance for connecting the hook, knife, or fork to the staff; and Fig. 5 is a perspective view of the fork.

We employ a straight staff, $a$, of wood, of suitable size and length, with a malleable-iron T-handle, $b$, at the upper end, and about three feet therefrom, provide said staff with a swivel-handle, $c$, contrived by pivoting it between the branched arms $d$, having eyes $e$ fitting on the staff $a$, so as to slide along it freely, between which eyes a collar or sleeve, $f$, is fixed at any point by a set-screw to fix the handle in position, thus enabling the handle $c$ to be set anywhere required on the staff, and to be shifted around the staff as may be required.

To connect the brier knife or hook $g$ or fork $h$ to the staff, we employ an upper ring or collar, $i$, fixed to the staff, and having a hole for the point end $j$ of the shank of the hook or fork, and a slot, $k$, for the key-bit $l$ of said shank; also, a lower collar, $m$, having a key-slot, $n$, adapted to the form of the square part $o$ of the shank, which collars are fitted to the taper of the staff, so that when they tighten thereon they occupy their proper positions with respect to the parts of the shank to which they fit. The lower collar, $m$, is shifted up along the staff to the upper one when the hook or fork is to be applied or removed, where it allows the shank to be inserted through collar $i$ and turned to lock therein by its key-bit. Then it shifts down to its position over the square $o$, securing the shank firmly to the staff, and thereby securing the knife, hook, or fork, the shanks of which will all be alike.

We propose to construct the fork to be used for gathering up and handling the briers, weeds, and other trash which the implement is designed to cut, with the tines set at right angles to the shank, or thereabout, as represented in Fig. 5, the object being to enable the fork to be used as a rake, also, for raking them up in a bunch, when they can be taken up on the fork by thrusting it down into the bunch and turning it over and projecting the fork-tines upward.

With this improved implement the operator may cut briers and other trash not such as may be handled without injury to his hands, and in a manner to be enabled to guard against snakes.

Having thus described our invention, what we claim as new, and desire to secure by Letters Patent, is—

1. The combination, with the staff and handle $c$, of a support having branches $d\ d$, a cross-pivot for the handle between said branches and the eyes $e\ e$, and the sleeve $f$, provided with a clamp-screw, as and for the purpose specified.

2. The combination, with the staff $a$, of the fixed collar $i$, having a hole and slot, as shown, a collar, $m$, having the slot $n$, and a hook or fork having end $j$, key-bit $l$, and square part $o$, as described.

FRANK P'POOL.
ELBERT S. P'POOL.

Witnesses:
C. D. COTTON,
J. B. GREAVES, Jr.